United States Patent
Shang et al.

(10) Patent No.: US 11,861,643 B2
(45) Date of Patent: *Jan. 2, 2024

(54) REINFORCEMENT LEARNING METHOD FOR DRIVER INCENTIVES: GENERATIVE ADVERSARIAL NETWORK FOR DRIVER-SYSTEM INTERACTIONS

(71) Applicant: BEIJING DIDI INFINITY TECHNOLOGY AND DEVELOPMENT CO., LTD., Beijing (CN)

(72) Inventors: Wenjie Shang, Mountain View, CA (US); Qingyang Li, Mountain View, CA (US); Zhiwei Qin, Mountain View, CA (US); Yiping Meng, Mountain View, CA (US); Yang Yu, Mountain View, CA (US); Jieping Ye, Mountain View, CA (US)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 35 days.

This patent is subject to a terminal disclaimer.

(21) Appl. No.: 17/618,864

(22) PCT Filed: Jun. 14, 2019

(86) PCT No.: PCT/CN2019/091255
§ 371 (c)(1),
(2) Date: Dec. 13, 2021

(87) PCT Pub. No.: WO2020/248223
PCT Pub. Date: Dec. 17, 2020

(65) Prior Publication Data
US 2022/0261833 A1    Aug. 18, 2022

(51) Int. Cl.
*G06N 3/08* (2023.01)
*G06Q 50/30* (2012.01)
(Continued)

(52) U.S. Cl.
CPC .......... *G06Q 30/0211* (2013.01); *G06N 3/08* (2013.01); *G06Q 30/0208* (2013.01); *G06Q 50/30* (2013.01); *G06Q 30/0219* (2013.01)

(58) Field of Classification Search
None
See application file for complete search history.

(56) References Cited

U.S. PATENT DOCUMENTS

| 11,348,135 | B1 * | 5/2022 | Ravindran | .......... G06Q 30/0244 |
| 2006/0173853 | A1 * | 8/2006 | Morris | .................... H04L 61/00 |

(Continued)

FOREIGN PATENT DOCUMENTS

CN    108711090 A    10/2018

OTHER PUBLICATIONS

JC Shi et al. Virtual-Taobao: Virtualizing Real-world Online Retail Environment for Reinforcement Learning. arXiv. May 25, 2018. <URL: https://arxiv.org/pdf/1805.10000.pdf> (Year: 2018).*

(Continued)

*Primary Examiner* — Bion A Shelden
(74) *Attorney, Agent, or Firm* — METIS IP LLC

(57) ABSTRACT

A system and method of determining a policy to prevent fading drivers is described. The system and method creates virtual trajectories of incentives such as coupons offered to drivers in a transportation hailing system and corresponding states of drivers in response to the incentives. A joint policy simulator is created from an incentive policy, a confounding incentive policy, and an incentive object policy to generate the simulated actions of drivers in response to different incentives. The rewards of the simulated actions of the (Continued)

drivers is determined by a discriminator. The incentive policy for preventing fading drivers is optimized by reinforcement learning based on the virtual trajectories generated by the joint policy simulator and discriminator.

20 Claims, 11 Drawing Sheets

(51) Int. Cl.
*G06Q 30/0211* (2023.01)
*G06Q 30/0208* (2023.01)
G06Q 30/0207 (2023.01)

(56) References Cited

U.S. PATENT DOCUMENTS

2013/0290043 A1  10/2013  Hoque et al.
2017/0193625 A1* 7/2017  Fan ................. G06Q 10/06315
2018/0189717 A1  7/2018  Cao

OTHER PUBLICATIONS

C Lu et al. Deconfounding Reinforcement Learning in Observational Settings . arXiv. Dec. 26, 2018. <URL: https://arxiv.org/pdf/1812.10576.pdf> (Year: 2018).*
J Song et al. Multi-Agent Generative Adversarial Imitation Learning. arXiv. Jul. 26, 2018. <URL: https://arxiv.org/pdf/1807.09936.pdf> (Year: 2018).*
International Search Report in PCT/CN2019/091255 dated Mar. 10, 2020, 3 pages.
Written Opinion in PCT/CN2019/091255 dated Mar. 10, 2020, 3 pages.

* cited by examiner

Algorithm 1 Build Simulator of Fading Drivers based on MAIL

---

Input: The historical trajectories of fading drivers over $T$ days: $D_{history} = \{\tau_1, \tau_2, ..., \tau_n\}$;
 Number of total iterations: $I$;
 Number of trajectories generated in each iteration: $J$;
 Times of updating joint policy in each iteration: $K$.
Output: Simulator(Joint policy $\pi_{joint}$): $<\pi_{didi}, \pi_u, \pi_{driver}>$.
1: Initialize policy $\pi_{joint}$ parameters $\theta$, discriminator $D$ parameters $\sigma$;
2: for $i = 1, 2, ..., I$ do
3:  $\tau_{sim} = \emptyset$;
4:  for $j = 1, 2, ..., J$ do
5:   $\tau_j = \emptyset$;
6:   Random sample one trajectory $\tau_r$ from $D_{history}$ and set its first state as initial observation $O_0$;
7:   for $t = 0, 2, ..., T - 1$ do
8:    Simulate current step actions $a^t_{didi}, a^t_{driver}$ from $\pi_{joint}(O_t)$;
9:    Generate current step state $s_t$ by concatenating $O_t$ with $a^t_{didi}$;
10:   Get current step reward $r_t = -\log(-D_\sigma(s_t, a^t_{driver}))$;
11:   Generate next step observation $O_{t+1}$ by replacing the dynamic features with $a^t_{driver}$;
12:   Add $\{s_t, a^t_{driver}, r_t\}$ to $\tau_j$;
13:   end for
14:   Add $\tau_j$ to $\tau_{sim}$;
15:  end for
16:  for $k = 1, 2, ..., K$ do
17:   TRPO update joint policy $\pi_{joint}$ parameters $\theta$ with simulated trajectories $\tau_{sim}$;
18:  end for
19:  update the discriminator $D$ by minimizing loss $$E_{x \sim \tau_{sim}}[\log(D_\sigma(x))] + E_{x \sim \tau_{real}}[\log(1 - D_\sigma(x))] ;$$

20: end for
21: return the trained joint policy $\pi_{joint}$ as simulator.

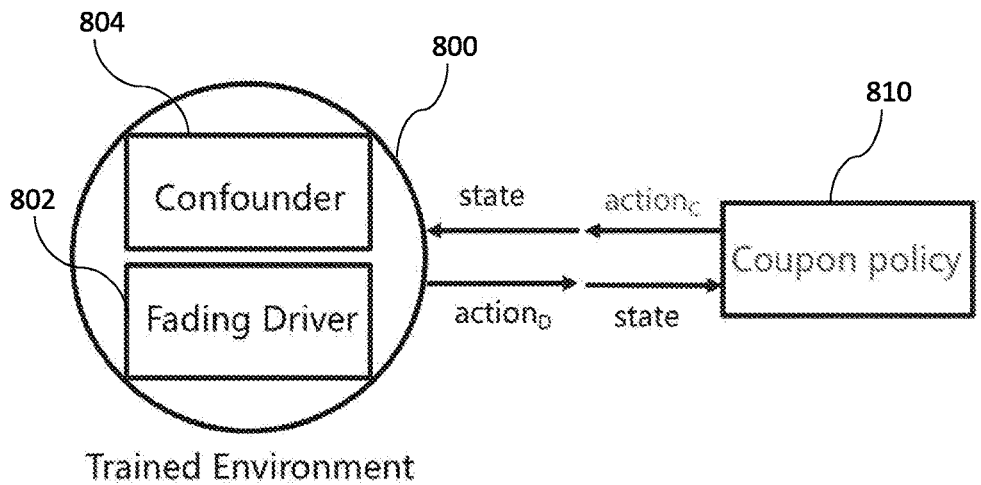

FIG. 10A

Table 1: The mean log likelihood of real data evaluated on simulator policy model

| Methods | On initial random model | Training data on simulator | Validation data on simulator |
|---|---|---|---|
| SUP | -7.32 | 17.09 | 18.00 |
| ORI | -7.43 | 18.43 | 17.85 |
| DouPol | -7.26 | 15.27 | 14.52 |
| TriPol | -7.21 | 21.74 | 21.21 |

FIG. 10B

Table 2: The Pearson correlation coefficient between the simulated and the real trend line of key factors.

| Methods | quantity of orders trend line | GMV trend line |
|---|---|---|
| SUP | -0.0212 | 0 |
| ORI | 0.4987 | 0.4252 |
| DouPol | 0.8129 | 0.7861 |
| TriPol | 0.7945 | 0.8596 |

FIG. 10C

Table 3: Results of policy evaluation in Simenv-T and Simenv-D

| | Simenv-T | | Simenv-D | |
|---|---|---|---|---|
| | Mean quantity of orders | Relative growth rate | Mean quantity of orders | Relative growth rate |
| Baseline | 20.54 | 0 | 24.60 | 0 |
| π_Sup | 11.63 | -43.30% | 23.78 | -3.33% |
| π_Ori | 6.90 | -66.40% | 24.24 | -1.46% |
| π_DouPol | 20.61 | +0.34% | 26.23 | +6.62% |
| π_TriPol | 23.69 | +15.30% | 32.70 | +32.90% |

REINFORCEMENT LEARNING METHOD FOR DRIVER INCENTIVES: GENERATIVE ADVERSARIAL NETWORK FOR DRIVER-SYSTEM INTERACTIONS

CROSS-REFERENCE TO RELATED APPLICATIONS

This patent application is a National Stage Application of International Application No. PCT/CN2019/091255 filed under 35 U.S.C. section 371, entitled "Reinforcement Learning Method For Driver Incentives: Generative Adversarial Network For Driver-System Interactions," which was filed on Jun. 14, 2019, the disclosure of which is hereby incorporated by reference in its entirety.

FIELD

This application relates to transportation hailing management services. In particular, the application is directed toward a system to electronically provide incentives to drivers in a transportation hailing system.

BACKGROUND

Recently transportation hailing systems, based on a model of matching drivers with passengers via applications on electronic devices with network communication, have become widespread. The success of such transportation hailing services depends on attracting passengers and retaining drivers. Thus, transportation hailing companies have set up systems to track passengers and drivers in order to perform analysis on how best to retain both. Such companies find it advantageous to predict driver patterns and therefore formulate targeted incentives to drivers to remain driving for the transportation hailing service.

Transportation hailing services rely on having sufficient numbers of drivers registered in compliance with the transportation service's platform of network based applications to satisfy the demands of passengers. One problem is the so-called fading driver, a driver who has declining participation, such as a decrease in driving frequency or length of time available for driving, compared to previous peaks in driving frequency or length of time. According to a life cycle evolution model of drivers, the number of fading drivers accounts for a non-negligible proportion of all active drivers. Therefore, the goal of a fading driver intervention project is to effectively incentivize the fading drivers to increase their driving frequency. One example of such incentives is personalized coupons that reward fading drivers for increasing their driving frequency. An incentive policy or strategy may be formulated using Machine Learning, Reinforcement Learning, Data Mining and other Artificial Intelligence techniques, so as to stimulate activeness of drivers. An incentive coupon typically includes a set amount of money that may be redeemed by a driver once that driver completes a certain number of trips during a set time period.

Due to the versatility of reinforcement learning, many tasks based on decision-making processes can apply reinforcement learning methods to optimize strategies such selecting which drivers to offer coupons to. Common historical interaction data accumulated in transportation hailing application systems may be collected. However, the current reinforcement learning algorithms rely heavily on large-scale sampling, which can be severely constrained due to low sampling efficiency and high cost in the real physical world of drivers and passengers. The key objective of this task is to optimize strategy using a reinforcement method with only historical data.

Based on the above goal of optimizing strategy using a reinforcement learning method with only historical data, the challenge is that historical data is static. Static data is actually generated from some kind of incentive policy executed in a history of passenger driver interactions. Static data cannot be used to directly evaluate different policies after improvement from an initial policy, which is the key step of reinforcement learning process.

Generally, using historical data to train an incentive policy is mainly focused on imitation learning. There are usually two types of traditional methods of imitation learning, Behavioral Cloning and Inverse Reinforcement Learning. Behavioral cloning formats historical data into supervised learning samples and uses supervised machine learning to derive strategies. Inverse reinforcement learning is based on the assumption that the historical data corresponds to the largest reward. Iteratively, the reward function is inferred from the data and then reinforcement learning is conducted to train a neural network to execute an incentive policy.

The above methods are based on the assumption that the historical data is generated by the optimal policy and meanwhile the final learned strategy is just an approximation of the historical strategy. Unfortunately, the historical strategy is not optimal in the task of intervening to prevent fading drivers. Intuitively the trained strategy is very likely to select inefficient and even useless intervention actions performed in history again, which can be absolutely insignificant in preventing fading drivers. Therefore, the previous imitation learning methods cannot be used directly to learn an effective incentive policy in changing driver behavior. Last but not least, the scenario of the driver intervention is dynamic and more complex. The driver's activity is affected not only by himself or herself but also some external interference factors. Such external interference factors are external environments that influence the decision-making and performance of drivers. Such factors may include competitive transportation services, weather, or high demand times such as holidays. These external interference factors may have an impact on the driver policy or driver behavior. Due to these factors, determining an algorithm simulating driver interaction for direct interaction and optimization of the drivers, incentive policies, and competitors is quite challenging. Thus, there is a need to use machine learning to determine an optimal driver incentive policy based on available historical data.

SUMMARY

One example disclosed is a transportation hailing system including a plurality of client devices, each of which are in communication with a network and execute an application to engage a transportation service. The system includes a plurality of transportation devices, each of which are associated with one of a plurality of drivers and execute an application to offer the transportation service. A database stores state and action data for each driver. The state data is associated with the transportation service provided by the driver and the action data associated with the driver receiving an incentive. An incentive system is coupled to the plurality of transportation devices and client devices via the network. The incentive system includes a joint policy model generator. The joint policy model generator is operable to construct historical trajectories of drivers in the plurality of drivers for a predetermined time period. The historical trajectories include the state and action data for the predetermined time period. The joint policy model generator is operable to generate an incentive policy with an input of the historic trajectory of a driver and an output of an incentive for the driver. The joint policy model generator is operable to generate a confounding incentive policy with an input of the historic trajectory of the driver, an input of the incentive for the driver, and an output of another incentive for the driver. The joint policy model generator is operable to generate an incentive object policy with an input of the historic trajectory of the driver, an input of an incentive for the driver, an input of another incentive for the driver, and an output of a simulated action of the driver. The incentive system includes a discriminator having an input of the historical trajectories and the simulated action for the driver from the policy generator. The discriminator has an output of rewards corresponding to each simulated action. The incentive system includes a reinforcement learning system that provides an optimized incentive policy from the simulated actions based on the rewards output. The incentive system includes an incentive server communicates a selected incentive to at least some of the transportation devices according to the optimized incentive policy.

Another disclosed example is a method to motivate drivers in a transportation hailing system. The transportation hailing system including a plurality of client devices, where each of the client devices are in communication with a network and execute an application to engage a transportation service. The transportation hailing system includes a plurality of transportation devices. Each of the transportation devices are associated with one of a plurality of drivers and execute an application to offer the transportation service. State and action data for each driver are stored in a database coupled to the network. The state data is associated with the transportation service provided by the driver and the action data associated with the driver receiving an incentive. Historical trajectories of drivers in the plurality of drivers are construed for a predetermined time period, wherein the historical trajectories include the state and action data for the predetermined time period. An incentive policy with an input of the historic trajectory of a driver and an output of an incentive for the driver is generated. A confounding incentive policy with an input of the historic trajectory of the driver, an input of the incentive for the driver, and an output of another incentive for the driver is generated. An incentive object policy with an input of the historic trajectory of the driver, an input of an incentive for the driver, an input of another incentive for the driver, and an output of a simulated action of the driver is generated. Rewards corresponding to each simulated action are determined from an output of a discriminator having an input of the historical trajectories and the simulated action of the driver. An optimized incentive policy is provided from the simulated actions based on the rewards output via reinforcement learning. A selected incentive is communicated to at least some of the transportation devices over the network according to the optimized incentive policy from an incentive server.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

Embodiments are illustrated by way of example and not limitation in the figures of the accompanying drawings, in which like references indicate similar elements and in which:

FIG. 7B illustrates a summary of programing steps for the process of training the joint policy in FIG. 7A;

FIG. 8 illustrates a diagram of an interactive environment for reinforcement learning for refining the example joint policy;

FIG. 10A is a table that compares the mean log likelihood of real data evaluated on a simulator policy model for each of the experiments in FIGS. 9A-9B;

FIG. 10B is a table that compares the Pearson correlation coefficient between the simulated and the real trend line of key factors of the experiments in FIGS. 9A-9B;

FIG. 10C is a table shows the results of policy evaluation in Simenv-T and Simenv-D, which were generated by experimental settings in FIGS. 9A-9B.

Figure 1:
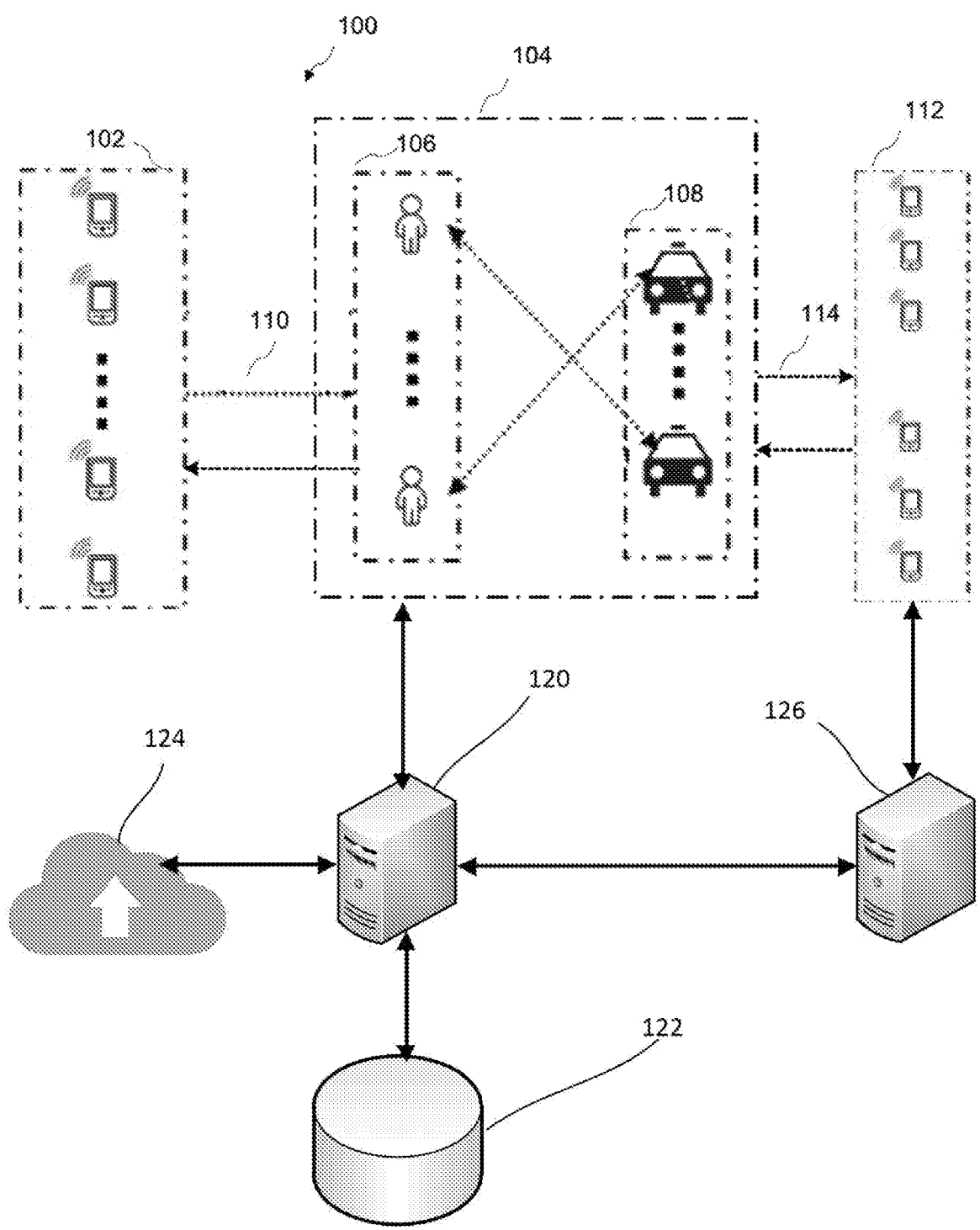
FIG. 1 illustrates a block diagram of a transportation hailing environment that includes intelligent distribution of incentives among drivers.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Embodiments of the transportation-hailing platform, such as a car-hailing platform, and related methods are configured to generate a policy to optimize incentives for attracting passengers to increase rewards for the transportation hailing system.

FIG. 1 illustrates a block diagram of a transportation hailing platform 100 according to an embodiment. The example transportation hailing platform 100 includes client devices 102 configured to communicate with a dispatch system 104 via a communication network 110. The dispatch system 104 is configured to generate an order list 106 and a driver list 108 based on information received from one or more client devices 102 and information received from one or more transportation devices 112. Typically, the transportation devices 112 are carried by drivers of transportation vehicles such as automobiles. The transportation devices 112 are digital devices that are configured to receive information from the dispatch system 104 and transmit information through a communication network 114. Such a configuration may be an application operated by the transportation devices 112. For some embodiments, communication network 110 and communication network 114 are the same network such as the Internet. The one or more transportation devices 112 are configured to transmit location information, acceptance of an order, and other information to the dispatch system 104. For some embodiments, the transportation device 112 transmission and receipt of information is automated, for example by using telemetry techniques. For other embodiments, at least some of the transmission and receipt of information is initiated by a driver.

The dispatch system 104 is configured to generate a price for transportation from an origin to a destination, for example in response to receiving a request from a client device 102. For some embodiments, the request is one or more data packets generated at the client device 102. The data packet includes, according to some embodiments, origin information, destination information, and a unique identifier. For some embodiments, the client device 102 generates a request in response to receiving input from a user or passenger, for example from an application running on the client device 102. For some embodiments, origin information is generated by an application based on location information received from the client device 102. The origin information is generated from information including, but not limited to, longitude and latitude coordinates (e.g., those received from a global navigation system), a cell tower, a wi-fi access point, network device and wireless transmitter having a known location. For some embodiments, the origin information is generated based on information, such as address information, input by a user into the client device 102. Destination information, for some embodiments, is input to a client device 102 by a user. For some embodiments, the dispatch system 104 is configured to request origin, destination, or other information in response to receiving a request for a price from a client device 102. Further, the request for information can occur using one or more requests for information transmitted from the dispatch system 104 to a client device 102.

The dispatch system 104 is configured to generate a quote based on a pricing strategy. A pricing strategy is based on two components: 1) a base price which is a fixed price relating to the travel distance, travel time, and other cost factors related to meeting the request for transportation; and 2) a pricing factor which is a multiple-cation over the base price. In this example, the pricing strategy is configured to take into account future effects. For example, the pricing strategy is configured to encourage requests (for example, by a decreased price) that transport a passenger from an area of less demand than supply of transportation and/or pricing power (referred to herein as a "cold area") to an area that has greater demand than supply of transportation and/or pricing power (referred to herein as a "hot area"). This helps to transform the requests from a passenger having an origin in a cold area into an order, that is a passenger that accepts the price quote for the transportation to a destination in a hot area. As another example, the dispatch system 104 is configured to generate a pricing strategy that discourages an order (for example, by a reasonably increased price) for a request for transportation from hot areas to cold areas.

After a driver is assigned to the passenger and drives the passenger to a hot area, the driver is more likely to be able to fulfill another order immediately. This mitigates the supply-demand imbalance, while potentially benefiting both the ride-hailing platform (with increased profit) and the passengers (with decreased waiting time). The future effect of a bubble pricing strategy is reflected from the repositioning of a driver, from the original position at the current time to the destination of the passenger at a future time.

Figure 11:
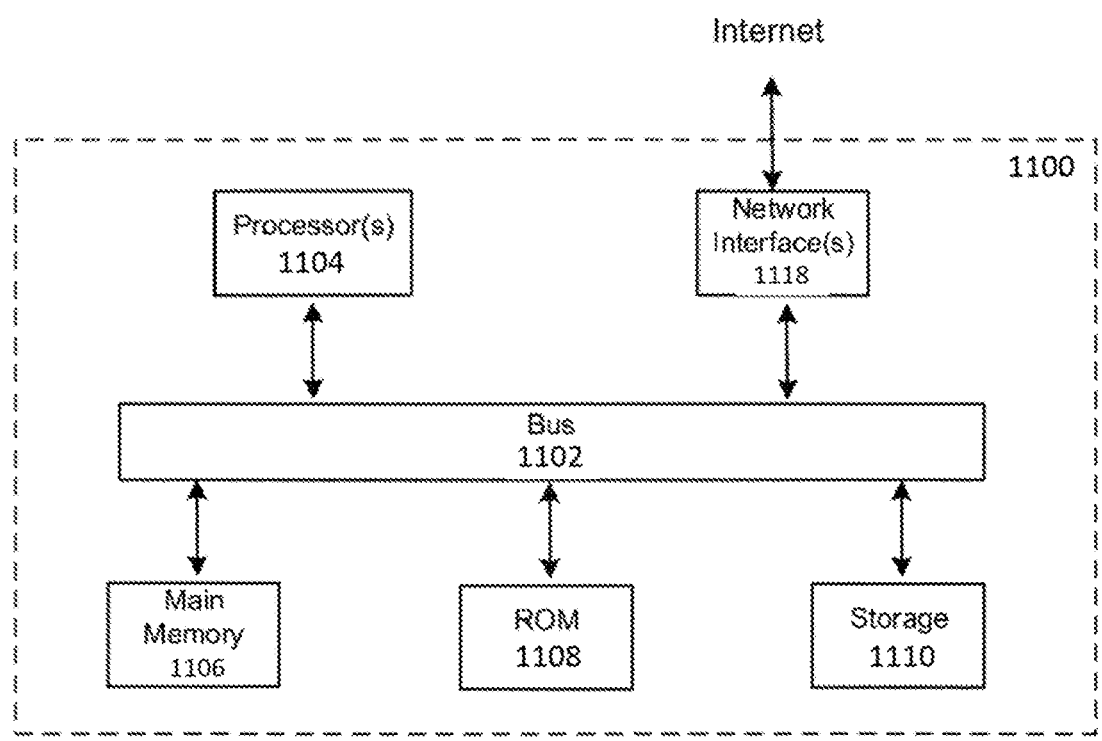
FIG. 11 illustrates a block diagram of an exemplary computer system in which any of the embodiments described herein may be implemented.

A digital device, such as the client devices 102 and the transportation devices 112, is any device with a processor and memory. In this example, both the client devices 102 and the transportation devices 112 are mobile devices that include an application to exchange relevant information to facilitate transportation hailing with the dispatch system 104. An embodiment of an example digital device is depicted in FIG. 11.

A driver incentive system also allows incentives to retain drivers, which are sent to the transportation devices 112 to incentivize the respective drivers to offer their services. The incentive system includes a strategy server 120 that determines the optimal incentive policies to retain drivers and avoid fading drivers. The strategy server 120 is coupled to a driver database 122. The driver database 122 includes driver background specific data and dynamic usage data from the rides provided by the driver. The driver database 122 receives such data from the strategy server 120. The strategy server 120 derives driver background data from the transportation devices 112 and from other sources such as the cloud 124. Thus, other information such as whether data, driver order data, and dates may be assembled and data mined by the strategy server 120 to provide a profile for each driver. The strategy server 120 derives dynamic usage data from the dispatch system 104 to determine summary data of the services provided by the drivers of the transportation hailing services.

The strategy server 120 is coupled to an incentive server 126 that pushes out different incentives to the transportation devices 112 via the communication network 114. The incentives in this example are coupons, that when redeemed by a driver, result in a monetary amount for providing a set number of rides to passengers via the transportation hailing service in a certain period of time. The specific drivers receiving the coupons and coupon amounts are determined according to the incentive strategy determined by the strategy server 120. The coupons may have different amounts, different periods of time for completion, different amounts of rides to earn the amount, and other parameters to incentive the driver. The coupons may also have different limitations such as geographic area, or times that the coupon may be earned by the driver.

In this example, the coupons are distributed via text messages sent to the transportation devices 112 via the communication network 114. However, other means may be used to distribute the coupons to drivers such as via emails or other electronic messaging media to the transportation devices 112 or other digital devices that a driver may have access to. On receiving the coupon on a transportation device 112, the driver may provide an input to the transportation device 112 to activate the coupon and thus redeem the coupon amount. The coupon may also be activated by the driver via the transportation hailing application on the transportation device 112. As explained above, the transportation hailing application will allow a request to be made for the transportation hailing service. The dispatch system 104 will receive the coupon and apply the amount to the driver completing the coupon requirements when contacting one of the transportation devices 112. As will be explained below, the strategy server 120 provides and improves a joint policy for optimal distribution of coupons to the transportation devices 112 based on selected drivers to maximize the rewards from the drivers.

Figure 2:
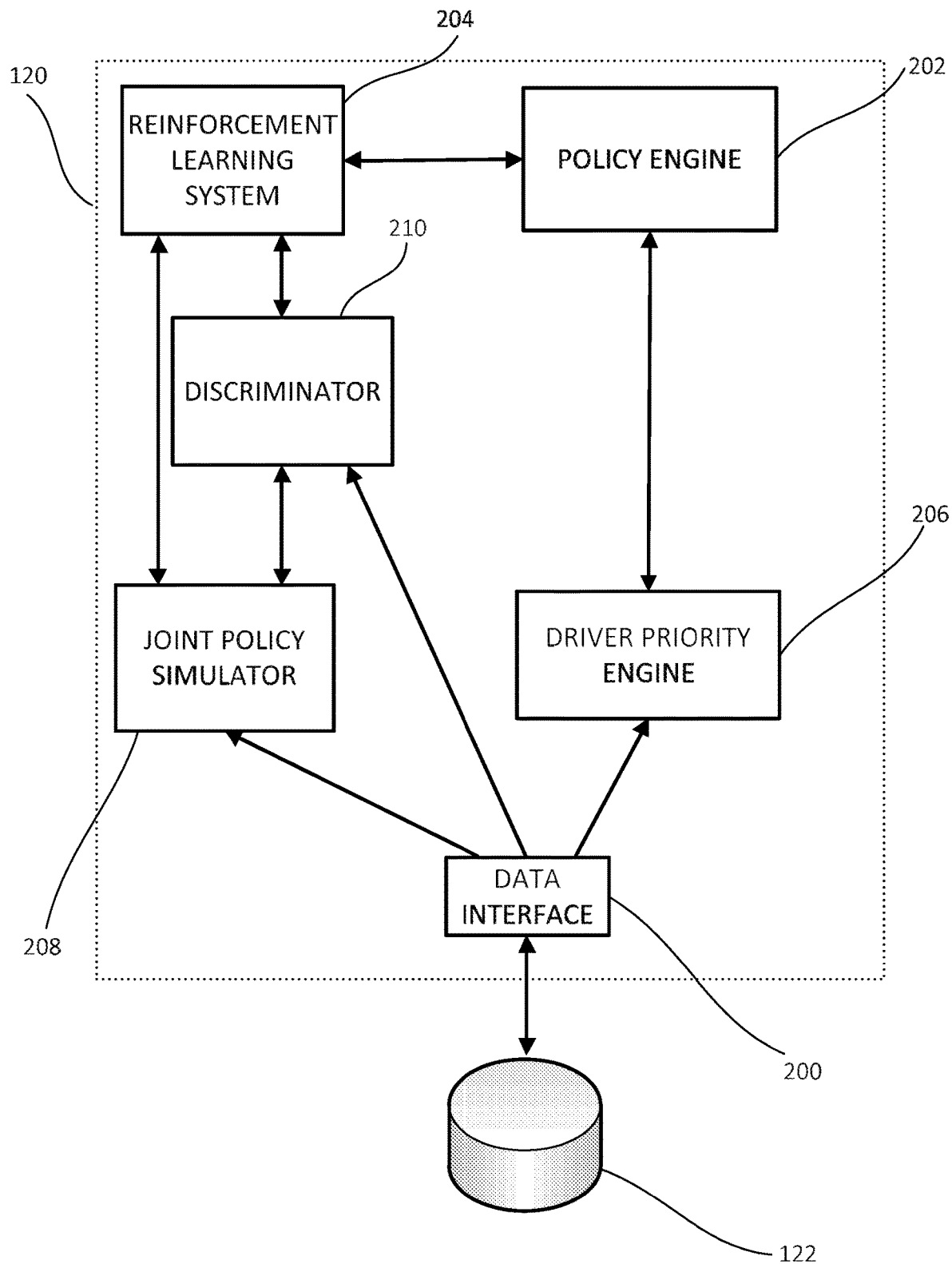
FIG. 2 illustrates a block diagram of an intelligent engine to determine the optimal policy for incentivizing drivers to prevent fading drivers.

FIG. 2 is a block diagram of the strategy engine 120 in FIG. 1. The strategy engine 120 includes a database interface 200, a policy engine 202, a reinforcement learning system 204, a driver priority engine 206, a policy simulator 208, and a discriminator 210. As will be explained below the policy engine 202 determines an incentive policy that optimizes the distributions of incentives such as coupons to the transportation devices 112 to minimize the fading driver problem. The policy engine 202 also determines potential fading drivers to provide the incentive policy. The driver priority engine 206 determines the ranking priority of the drivers in order to allocate an incentive budget based on the incentive policy implemented by the policy engine 202.

The incentive policy implemented by the policy engine 202 is optimized by the reinforcement learning system 204. The reinforcement learning system 204 optimizes the policy of the policy engine 202 through the generation of virtual trajectories of rewards, driver incentives and driver actions based on the incentives. The virtual trajectories are generated by the combination of the joint policy simulator 208 and the discriminator 210. The joint policy simulator 208 outputs the simulated actions of drivers based on an incentive policy, a driver (incentive object) policy, and a confounding policy. The rewards of each of the actions are determined by the discriminator 210.

The incentive policy or strategy for the transportation hailing platform 100 to minimize fading drivers may be formulated as a fading driver intervention task. This task may be formalized into the following three subproblems. 1) Given the days of an intervention cycle T, a total budget B: determine a budget $B_t$ on day t; 2) Given a budget $B_t$, and drivers D: determine, $P_t$, the priority queue of D to be sent an incentive such as a coupon; and 3) Given the budget $B_t$ and the priority queue $P_t$: determine the coupon parameters $C_i$ for a driver $D_i$.

Generally, the first subproblem of determining the budget of a day may be handled by a conventional method that divides the total budget B into T equal parts for each day, that is $$B_t = \frac{B}{T}.$$

Alternatively, a higher proportion of the total budget may be allocated to the weekend days over the period T. The second and third subproblems are solved in combination. Under the budget constraint, the priority queue of drivers can be ranked by the expected reward and coupon parameters given by the incentive policy. Thus, the key to the second and third subproblems lies in how to optimize and evaluate the coupon policy.

The example fading driver problem solved by reinforcement learning (RL) can be represented by a Markov Decision Processes (MDP) quintuple <S, A, T, R, γ>, where S is the state space, A is the action space, T:S×A ↦ S is the state transition model, R:S×A ↦ ℝ is the reward function, and γ is the discount coefficient of cumulative reward. Reinforcement learning is used to optimize the policy π:S ↦ A to achieve a specific goal by enabling agents to learn from the interactions with the environment. The agent observes state S from the environment, selects action A given by the policy π to be executed in the environment, observes the next state, and obtains the reward R at the same time, until the terminal state is reached. Consequently, the expected cumulative reward obtained by the optimal policy π* is the largest. The goal of a reinforcement learning method is to find the optimal policy π*.

Figure 3:
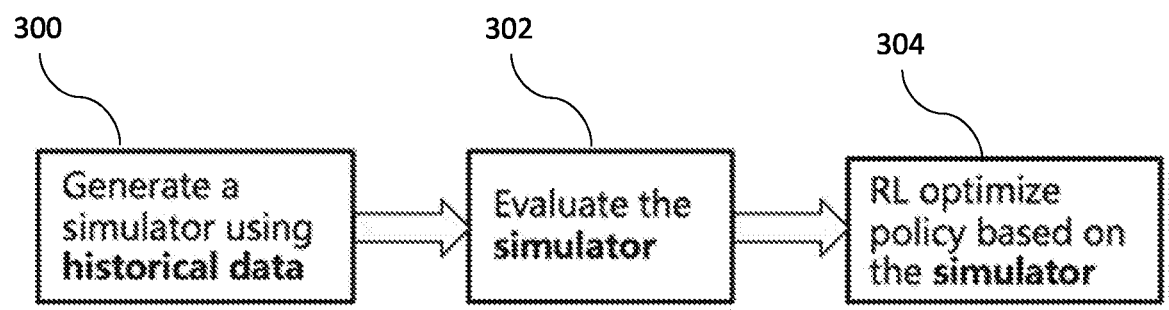
FIG. 3 illustrates a flow diagram of generating and optimizing a driver incentive policy based on a simulator.

In the example driver incentive system, the policy determination is based on a general pipeline for applying reinforcement learning to optimize objective policy based on historical data. Traditional reinforcement learning requires a real environment or a simulator to evaluate whether a policy works better. In the case of incentive policies for drivers, it is difficult to interact directly with the drivers to evaluate the policy in the real world since the policy may bring some bad user experiences in case of some bad policy. For some embodiments, reinforcement learning needs to interact with the environment to learn what the benefits of each strategy are, and then combine the strategies for serialization decisions. The interaction directly with the real driver online, may produce some bad strategies and bad cases during the training. This can greatly affect the driver's experience and cause bad results. Thus, it is crucial to build a simulator to simulate the driver behavior and performance in the real world to evaluate the different driver incentive policies. As FIG. 3 shows, first and foremost, a simulator of the specific scenario is generated in real world using historical data (300). The generated simulator is then evaluated from different aspects to insure its availability (302). Once the simulator is built well, various reinforcement learning algorithms may be performed to optimize the objective policy by interacting with the output of the simulator (304).

As the most important step in the pipeline, an environment simulator is constructed (300) that can effectively depict the key dynamics of the specific scenario. Taking the scenario of a fading driver and intervening to prevent the condition as an example, historical data may be used to learn a dynamic model of the fading drivers. Such a dynamic model may effectively simulate the behavior of drivers during the next day under the incentives that may be offered. Thus, in this example, the dynamic model can simulate the behavior policy of drivers who have received coupon incentives from the transportation devices 112 in FIG. 1.

It can be observed that the driver policy and the transportation hailing platform policy are interactive in the fading driver intervention scenario. The driver policy (behavior of drivers) and the transportation hailing platform policy (policy to incentivize drivers) also have the nature of "mutual environment" from the perspective of the MDP. In this example, the drivers that may be considered fading drivers is based on whether a recent daily average order quantity for a driver has a significant reduction trend compared to previous period. For example, if the order volume for a driver during one week is one-third less than that observed from the last month, the driver will be marked as a fading driver. In this example, a decay probability for all drivers is calculated based on the decay behavior of the driver. Drivers with a decay probability between 0.6 and 0.9 are selected for potential application of the incentive policy in this example. However, other ranges of decay probabilities may be used to select drivers.

Figure 4:
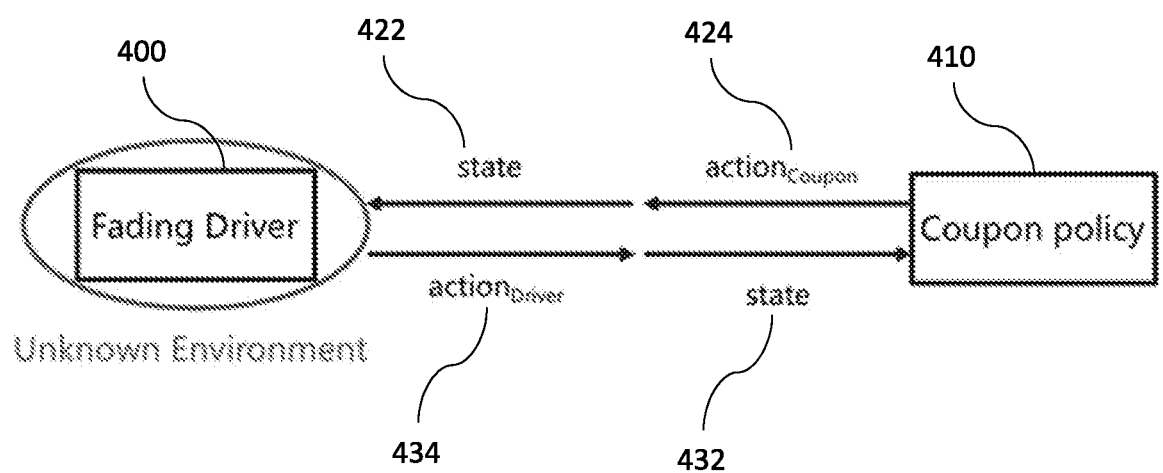
FIG. 4 illustrates a flow diagram of the mutual environment interaction between a driver and a driver incentive policy.

FIG. 4 shows the interaction between a fading driver modeled as a fading driver policy 400 and the transportation hailing platform incentive policy such as a coupon policy 410. FIG. 4 shows the nature of mutual environment between the fading driver policy 400 and the incentive policy 410. From the point of view of the coupon policy 410, a driver's static characteristics and the dynamic behavior characteristics of that day are the observations constituting a driver state 422, and the coupon given by the coupon policy 410 during the next day is a policy action 424. Correspondingly, from the driver's strategy point of view as represented by the fading driver policy 400, the next-day coupon is the driver observation constituting a driver state 432, and the next-day dynamic behavior of the driver is an action 434. Thus the next-day dynamic behavior of the driver may be the count of finished rides or total GMV (Gross Merchandise Volume) for the next day.

Based on the above relationship, the historical data is integrated and then constructed into historical trajectories, $D_{history} = \{\tau_1, \ldots \tau_i, \ldots, \tau_n\}$ representing the trajectories of n fading drivers in the intervention period of T days. The trajectory, $\tau_i = (s_0, a_1, s_1, a_2, \ldots, s_t, a_{t+1}, \ldots s_{T-1})$ represents the observed sequence of state-action pairs of the driver $D_i$ in the intervention period of T days.

Figure 5:
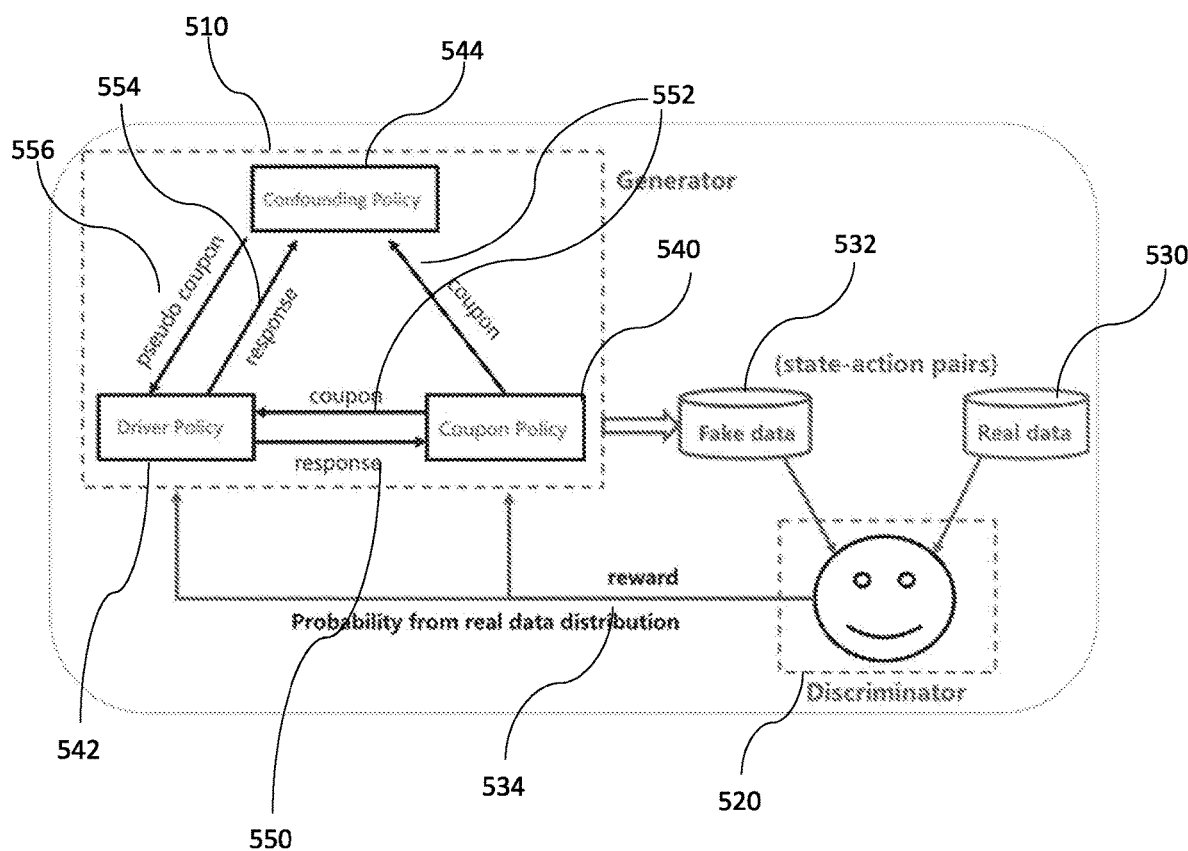
FIG. 5 illustrates a training framework for an example simulator of state and actions of drivers.

The goal of generating a simulator is "simulation" of trajectories similar to real historical trajectories. Thus, the objective is to train a simulator that can generate trajectories similar to the real historical trajectories. To achieve this goal, a multi-agent imitation learning framework based on generative adversarial training is used. FIG. 5 illustrates the application of this process to generate a simulator of the fading driver incentive task. FIG. 5 shows a simulation generator module 510 and a discriminator 520.

The whole process framework adopts the generative adversarial training method. The generator module 510 is the multi-agent interactive environment defined according to the real world scenario and is used to simulate the generation of trajectory data.

The discriminator 520 is a binary classifier whose input is state-action pair data, such as (s, a) and whose output is the probability that the data comes from the joint distribution of a real state and action. In this example, the input is in the form of real data 530 from the driver database 122 in FIG. 1 in the form of real trajectories and generated fake or simulated data 532 from the generator module 510 in the form of simulated or virtual trajectories. The discriminator 520 may be trained with supervised learning by labeling the historical real state-action pair as 1 and the generated fake state-action pair as 0. Then the discriminator 520 is used as a reward giver for each agent when generating trajectory data as shown by a reward output 534 provided to the generator module 510. Thus, each agent policy in the generator module 510 is optimized by a reinforcement learning method to jointly maximize the T-steps cumulative rewards of the generated trajectory, that is the truth of the whole generated trajectory, which is in line with the "simulation" goal. Thus, the generator module 510 generates a large quantity of simulated or virtual trajectory data, which is the fake or simulated data 532. The database 122 includes a large quantity of historical data trajectories, which is the real data 530. The discriminator 520 identifies whether each trajectory is fake data or real data. When the discriminator 520 cannot determine whether each trajectory of data is fake data or real data, this shows that the fake data generated by the simulator is very close to the distribution of real data. This establishes that the simulation from the simulator is sufficient.

In the generator module 510, a multi-agent interactive environment under an intervention scenario is defined. The generator module 510 thus includes an intervenor strategy such as a coupon policy 540 and an intervention object strategy such as a driver policy 542. In addition to the intervenor strategy (coupon policy 540) and the intervention object strategy (driver policy 542), the confounding effect often studied in causal inference adds a dynamic confounding factor model 544 (Confounding Policy) into the original interactive scenario, which is also a key innovation. In this example, the coupon policy 540 is the incentive policy of the transportation hailing system 100. The confounding policy 544 is a collection of external environmental factors that influence the decision-making and performance of drivers. Such factors may include competitors to the transportation hailing service, weather or holiday factors. These can have an impact on the behavior of the drivers as modeled by the driver policy 542. The driver policy 542 is the description of the decision and performance of a driver when receiving an incentive. Thus, the driver policy 542 may include the order quantity of the driver on the day, the total GMV of the day, the total distance of the day, the total driving time of the day, and the total driving distance of the day. These are used to describe the decisions and performances when the driver receives the incentive.

In order to ensure better generalization performance of the whole simulator, the three agent policies (strategies), the coupon incentive policy 540, driver policy 542, and confounding policy 544, are all dynamically generated through learning. According to the interactive relationship between agent policies, the input and output of each agent policy 540, 542, and 544 are defined as follows.

The coupon incentive policy $\pi_{didi}$ 540 has an input 550 that is observation $O_{didi}^t$ including the driver's static features (using real data) and the driver's dynamic behavior features $a_{driver}^{t-1}$ (generated from the driver policy 542). An output 552 of the coupon incentive policy 540 is the coupon parameters $a_{didi}^t$ to be sent to drivers. The confounding policy, $\pi_u$ 544, has an input 554 that is observation $O_u^t$ including the driver's static features observation $O_{didi}^t$ and the incentive coupon action, $a_{didi}^t$ output 552 from the coupon incentive policy 540. The output of the confounding policy 544 is the incentive action, $a_u^t$, (pseudo coupon) 556 which is in the same format as the coupon parameters input $a_{didi}^t$. The driver policy, $\pi_{driver}$ 542 has an input of the observation, $O_{driver}^t$ river that includes the observation including driver static features, incentive coupon action from the coupon incentive policy 540, and the incentive action from the confounding policy 544, $(O_{didi}^t, a_{didi}^t$ and $a_u^t)$. The output of the driver policy 542 is the action $a_{driver}^t$, 550 that indicates the behavior features of the driver.

Thus, the entire interaction of the policies 540, 542 and 544 in the generator 510 are designed to generate and produce the overall simulated trajectory of the driver, such as $\tau = (s_0, a_1, s_1, a_2, \ldots, s_t, a_{(t+1)}, \ldots, s_{(T-1)})$. The three policy components 540, 542 and 544 are cyclical in relation to each other. When there is a behavioral characteristic of the driver, the action of the next time period can be generated. Finally, when the length of the trajectory is set to T, the complete simulated trajectory T can be produced.

Figure 6:
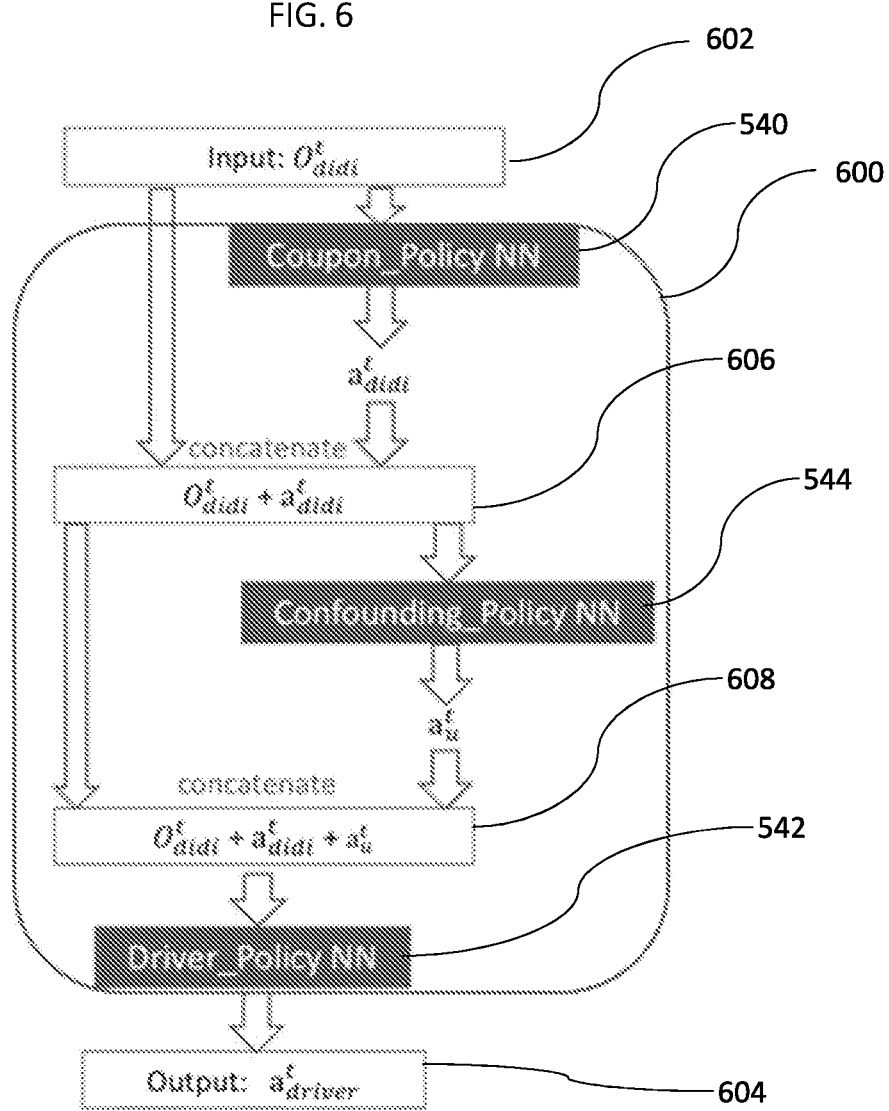
FIG. 6 illustrates a structure of an example joint policy neural network.

Based on the above interaction relationship, a joint policy model $<\pi_{didi}, \pi_u, \pi_{driver}>$ named $\pi_{joint}$ is constructed. The relationship of the joint policy model with the three agent strategies may be expressed as $\pi_{joint}(O_{didi}^t) = <\pi_{driver}\{O_{didi}^t, \pi_{didi}(O_{didi}^t), \pi_u[O_{didi}^t, \pi_{didi}(O_{didi}^t)]\}>$. The input of the joint policy model is the driver static features, $O_{didi}^t$, and the output is the driver action, $a_{driver}^t$. The specific structure of a joint policy 600 is shown in FIG. 6. Through this form of joint policy 600, the generation of a simulator is simplified to training a joint policy model. The joint policy 600 is thus composed of the coupon policy 540, the confounding policy 544, and the driver policy 542. When training the model, the three policies are trained together. The purpose of such training is to insure the model will converge. Each policy is not trained alone because this may cause the model to not converge. Thus, the problems of low training efficiency and non-guarantee of convergence caused by iterative optimization of multiple policy models are avoided.

The training process of the joint policy, $\pi_{joint}$ 600 is as follows. First, one driver is randomly sampled from historical data each time, and the first state of the driver is set as an initial observation, $O_{didi}^0$. Then the joint policy, $\pi_{joint}$ 600, is used to generate a whole trajectory triggered from the initial observation, $O_{didi}^0$, for each time, $O_{didi}^t$ (600). Given the observation for each time, $O_{didi}^t$ as an input 602 of the joint policy, $\pi_{joint}$ 600, the incentive coupon action, $a^t_{didi}$ and the action of the driver, $a^t_{driver}$ may be obtained as an output 604. The action of the driver may thus be obtained from the embedded coupon and driver policies 540 and 544 ($\pi_{didi}$ and $\pi_{driver}$), respectively. According to the previous definition of the state of the driver, the state on t step, $s^t$, can be constructed by concatenating the observation for each time, $O_{didi}^t$ and the incentive coupon action, $a_{didi}^t$ (606). As shown in FIG. 6, the incentive coupon action, $a_{didi}^t$ is output from the embedded coupon policy 540. The constructed state of the concatenated observation and incentive coupon action are input to the confounding policy 544 to output the incentive action, $a_u^t$. The observation for each time, $O_{didi}^t$, the incentive coupon action, $a_{didi}^t$, and the incentive action, $a_u^t$ are concatenated (608) as the input for the driver policy 542. The resulting output is the action of the driver, $a_{driver}^t$ output 604

Then the reward on the t step, $r^t$, is obtained from the output of the discriminator 520 in FIG. 5 given the inputs of the state on t step and the action of the driver ($s^t, a_{driver}^t$). The reward $r^t$ is defined as:

$$r^t = -\log(1 - D_\sigma(s^t, a_{driver}^t))$$

This equation indicates that the closer to 1 the output of the discriminator for a generated state-action pair is, the higher the reward is. The definition of this reward function is based on the function of the discriminator. The discriminator is used to distinguish whether the generated trajectory is a real trajectory. If the value given by the discriminator is close to 1, the realism of the simulation is higher, and the corresponding reward is also higher.

The next observation, $O_{didi}^{t+1}$, is generated by combining the driver's static features (using real data) and the simulated dynamic behavior features, $a_{driver}^t$. In this example, the static features may include the driver's service rating, tenure on the platform, and activity within the past 30/60/90 days. This is the definition of one simulative transition step in the simulator and a simulated trajectory of length T can be generated by cycling T steps in this way.

Figure 7A:
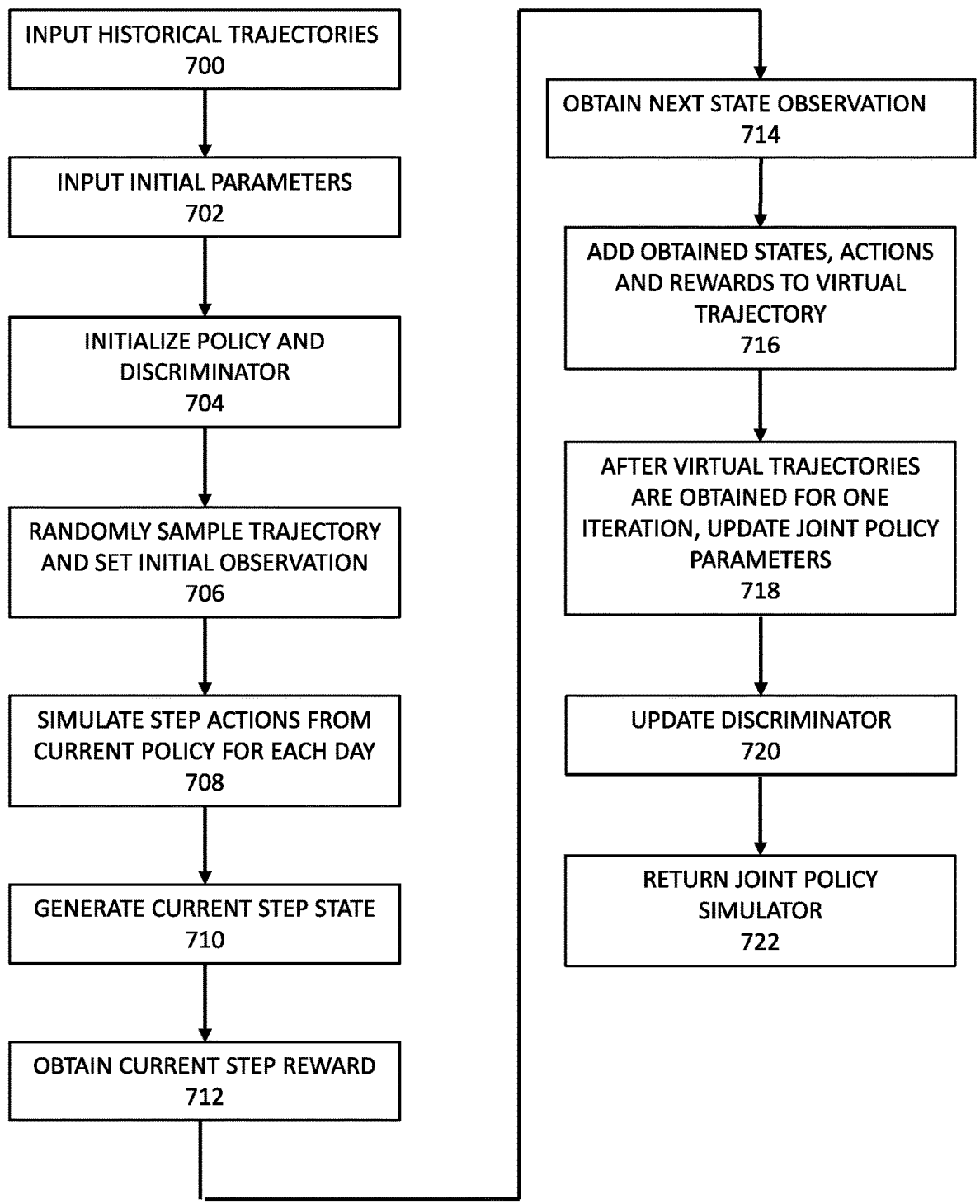
FIG. 7A illustrates a flow diagram for the overall process of training a joint policy for offering drivers incentives.

The training routine of the simulator of the joint policy is shown in a flow diagram in FIG. 7A and a summary of programming steps in FIG. 7B. First, the historical trajectories of fading drivers, $D_{history} = \{\tau_1, \tau_2, \ldots, \tau_n\}$, are obtained over T days (700). The number of total iterations, I, the number of trajectories generated per iteration, J, and times of updating the joint policy in each iteration, K, are set (702). The initial parameters, $\theta$, of the policy, $\pi_{joint}$ and the initial parameters, $\sigma$, of the discriminator, D, are set (704).

For each of the iterations up to the number of total iterations, the virtual trajectory, $\tau_{sim}$ is set to null. For each of the trajectories up to the number of trajectories generated for each of the iterations, the trajectory is set to null. The routine then randomly samples one trajectory, $\tau_\gamma$, from the historical trajectories of fading drivers, $D_{history}$, and sets its first state as the initial observation, $O_0$ (706). For each of the days during the period T, current step actions ($a_{didi}^t, a_{driver}^t$) are simulated from the joint policy, $\pi_{joint}$ ($O_0$) (708). The current step state, $s_t$, is generated by concatenating the observation, $O_t$ with the action, $a_{didi}^t$ (710). The current step reward is obtained, $r^t = -\log(1 - D_\sigma(s^t, a_{driver}^t))$ (712). The next state observation, $O_{t+1}$, is generated by replacing the dynamic features with the driver action, $a_{driver}^t$ (714). After these steps are obtained for each of the days during the period T, the obtained states, driver actions, and current step rewards ($s^t, a_{driver}^t, r^t$) are added to the virtual trajectory, $\tau_{sim}$ (716). After the above cycles are performed for one of the iterations, a policy gradient method such as trust region policy optimization (TRPO) may be used for reinforcement learning to update the joint policy parameters, $\theta$, with the simulated trajectories (718). After all the iterations are complete, the discriminator is updated by minimizing the loss (720). The discriminator is updated by:

$$E_{x \sim \tau_{sim}}[\log(D_\sigma(x))] + E_{x \sim \tau_{real}}[\log(1 - D\sigma(x))]$$

$D_\sigma(x)$ represents the probability that x is a different data source. The data source could be either the simulation data and real data. $\sigma$ is the discriminator network parameter. The term $Ex \sim \tau_{sim} [\log(D_\sigma(x))]$ is the expectation of log likelihood that x came from the simulated trajectory is different the data source. The term $Ex \sim \tau_{real} [\log(1 - D_\sigma(x))]$ is expectation of log likelihood that the real history trajectory is the same as the data source since the log likelihood is $1 - D_\sigma(x)$. The whole process is updated by minimizing the objective function to minimize the difference between generated simulated trajectory and the real history trajectory. The joint policy is returned as the simulator (722).

Once the joint policy, $\pi_{joint}$, is trained by the above process, the simulator of the fading driver is built. Various reinforcement learning algorithms may be performed to optimize the incentive policy, $\pi_{didi}$, of the transportation hailing system using the joint policy simulator.

After the joint policy is trained, it is used as an interactive environment to optimize the incentive policy by reinforcement learning. The scenario of obtaining an incentive policy to prevent fading drivers is taken as an example as shown in FIG. 8. FIG. 8 shows the relation between a trained environment 800 and an incentive policy, such as a coupon policy 810 for the transportation hailing system 100. The trained environment 800 includes a fading driver policy 802 and a confounding policy 804. The goal is to optimize the coupon policy, $\pi_{didi}$, (810), therefore, the fixed $\pi_{driver}$ and $\pi_u$ polices, 802 and 804, respectively in the joint policy model constitute the interactive environment, E, for training the joint policy model. The environment E can provide the state transition process and the driver's response behavior (such as a count of finished orders and GMV) as the reward for training the coupon policy, $\pi_{didi}$. Therefore, a reinforcement learning algorithm such as TRPO can be performed flexibly based on the environment E to get an optimized incentive policy, $\pi^*_{didi}$. The optimized policy has better robustness because of the modeling of the confounding effect contained in the environment, E.

After optimizing the coupon policy, the third subproblem of providing coupons explained above is solved. Then the budget constraints with a priority queue of drivers are addressed in the second subproblem explained above. Given a constraint of the daily budget, $B_t$, the priority of drivers to be sent the coupon without exceeding the amount of the daily budget, $B_t$ must be decided.

In the previous step, the coupon policy can be optimized by applying trust region policy optimization (TRPO), an effective policy gradient method, in reinforcement learning. While optimizing policy by TRPO, the policy gradient is calculated with the help of a state value function, V(s) (usually implemented by a neural network), which represents the expected cumulative reward for the driver in state s until the end of the T days incentive period. This value is extremely related to the goal of fading driver incentive project, so this value is used to define an indicator for priority ranking. The V value is used to measure the value of the driver in the entire trajectory and is used to compare the different drivers to find the most valuable driver for the coupon incentives. Because generally the incentive budget is limited, decisions have to be made for which drivers should be subject to the coupon policy. The V value is used to compare the values between drivers to obtain a ranking for priority. For a driver, $d_i$, the daily average quantity of finished orders $n_i$ in the week before the incentive period can be obtained from the statistics of historical data. During the incentive period, the ranking priority for drivers on the t-th day is defined as:

$$p_i^t = \frac{V(s_i^t)}{T} - n_i$$

The term $p_i^t$ is the ranking priority for the ith driver on the t-th day. The term $s_i^t$ is the state feature for the ith driver in the t-th day. V is the value associated with that driver in the t-th day. T is the number of days in this activity.

The ranking priority of the driver, $p_i^t$, is ordered from the highest to the lowest and then the drivers are selected in turn to send the type of coupon, $C_i^t$, given by the optimized policy, $\pi_{didi}(s_i^t)$ until the budget $B_t$ is used up. The highest priority drivers are thus those with the highest value. Thus, subproblem 2 of selecting drivers to be sent coupons is solved. According to the above pipeline, the fading driver incentive task can be settled by reinforcement learning smoothly.

In order to ensure the usability of the above described simulator, the performance of the simulator was evaluated through comparative experiments from various aspects. Specifically, four comparative experiments were set up: 1) SUP (supervised learning driver policy with historical data i.e., Behavioral Cloning); (2) ORI (consistent with the method described above, except that coupon policy is replaced by historical record of coupon sending instead of dynamic learning.); 3) TriPol (the method completely consistent with the above description of the joint policy from confounding policy, driver policy and incentive policy); and (4) DouPol (consistent with the setting TriPol except that the confounding policy is removed as a control to verify the effect of confounding policy).

Figure 9A:
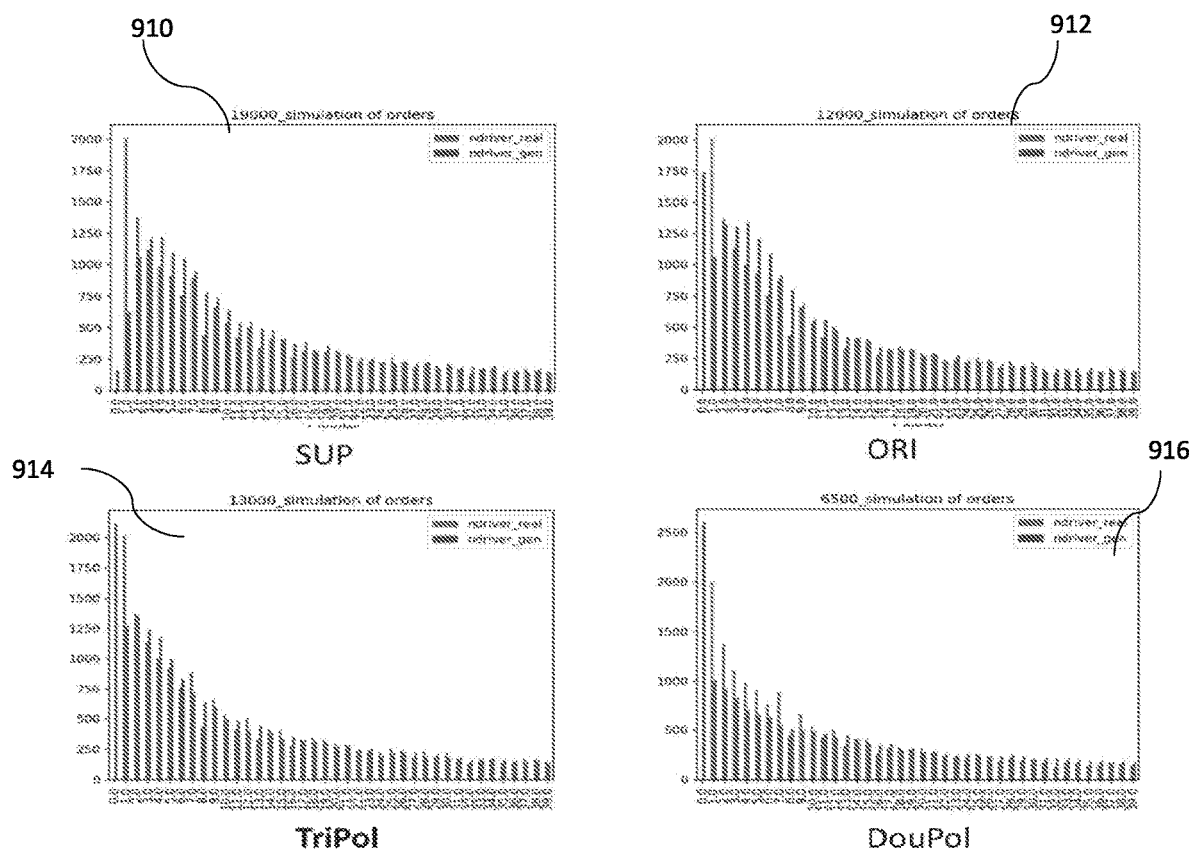
FIG. 9A illustrates graphs of results from experiments based on training data sets.

FIG. 9A shows the training set of graphs of the four experiments. Thus, FIG. 9A shows a graph 910 of the training set for the supervised learning driver policy with historical data, a graph 912 of the training set of a supervised learned driver policy using a historical record of coupon sending, a graph 914 that shows the training set for the combination of driver and incentive policy with confounding policy, and a graph 916 that shows the training set for the driver and incentive policy without the confounding policy. Each of the graphs 910, 912, 914, and 916 include a first set of bars showing the real distribution of order numbers. A second set of bars show the simulated distributions.

Figure 9B:
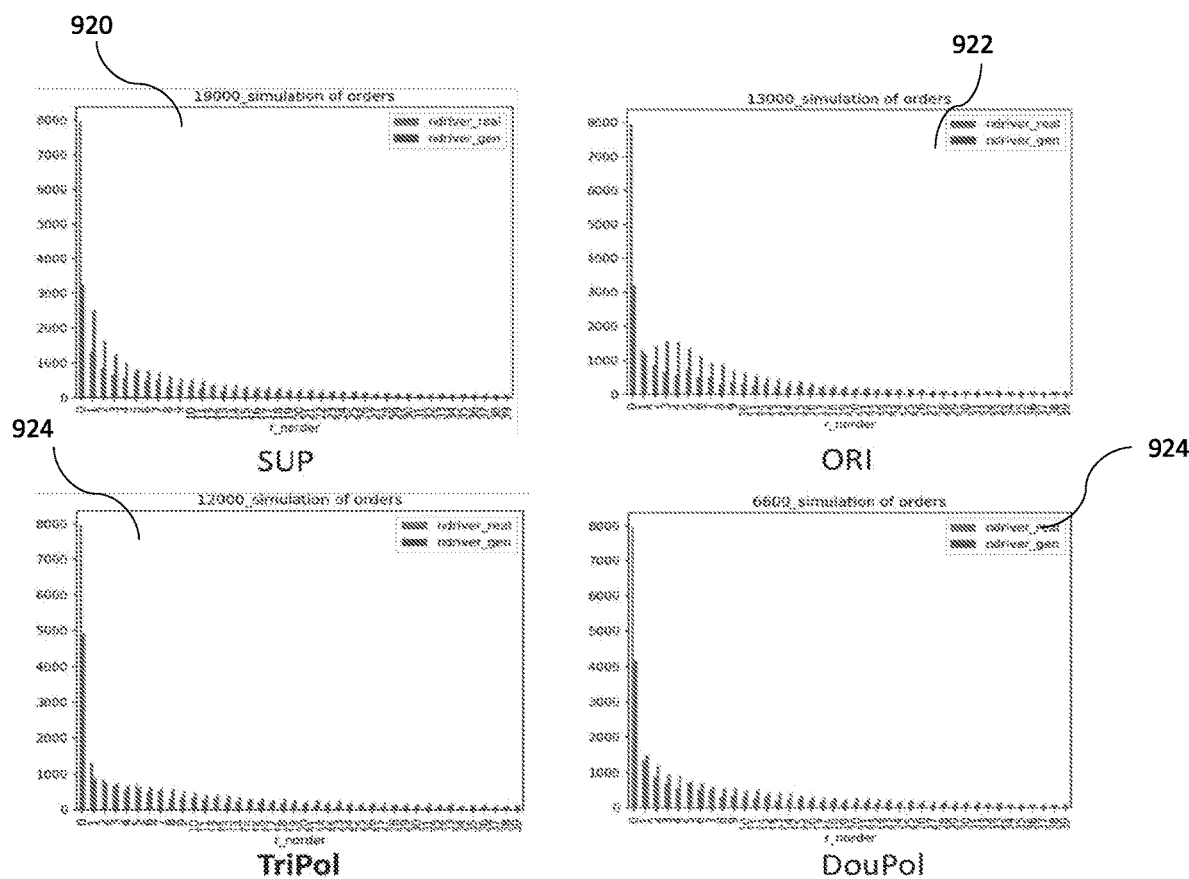
FIG. 9B illustrates graphs of results from experiments based on actual data sets.

FIG. 9B shows the set of graphs of the real distribution of the four experiments. Thus, FIG. 9B shows a graph 920 of the real distribution from the supervised learning driver policy with historical data, a graph 922 of the real distribution of a supervised learned driver policy using a historical record of coupon sending, a graph 924 that shows the real distribution for the combination of driver and incentive policy with confounding policy, and a graph 926 that shows the real distribution for the driver and incentive policy without the confounding policy. Each of the graphs shows the real distribution of order numbers. A second set of bars show the simulated distributions.

As the graphs in FIGS. 9A-9B show, the simulator trained from the TriPol setting can generate more realistic distribution both on the training data and the validation data among the four experiments. This is a statistical perspective on the performance of simulator, which is a fundamental guarantee of the simulator generating algorithm.

FIG. 10A is a table that compare the mean log likelihood of real data evaluated on simulator policy model for each of the four experiments. As shown in the table in FIG. 10A, from the aspect of the mean log likelihood of real data evaluated on simulator policy model, the TriPol setting also achieves the best performance on both training data and validation data.

FIG. 10B is a table that compares the Pearson correlation coefficient between the simulated and the real trend line of key factors of the four experiments. As the table in FIG. 10B shows, the simulators trained from the DouPol and TriPol settings can both depict the trend of factors well while the depiction results of the other two methods are relatively bad.

FIG. 10C is a table that shows the results of policy evaluation in Simenv-T and Simenv-D, which were generated by the TriPol and DouPol settings. These results were obtained by using a reinforcement learning algorithm to train an optimized coupon policy in the four different simulators. Then two simulators, namely Simenv-T and Simenv-D, are generated respectively by TriPol and DouPol settings using validation data. Based on the Simenv-T and Simenv-D simulators, the four optimized policies are evaluated and the results are shown in the table in FIG. 10C.

As may be seen, the policy, π_TriPol, trained from the simulator by the TriPol setting, has the best performance among four policies in terms of mean quantity of orders and relative growth rate. These results further confirm the effectiveness and generalization performance of the above described method to obtain an optimal driver incentive policy.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

FIG. 11 is a block diagram that illustrates a computer system 1100 upon which any of the embodiments described herein may be implemented. The system 1100 may correspond to the client devices 102 or the transportation devices 112 described above. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions. The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the operations, methods, and processes described herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The main memory 1106, the ROM 1108, and/or the storage 1110 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 1100 also includes a network interface 1118 coupled to bus 1102. Network interface 1118 provides a two-way data communication coupling to one or more network links that are connected to one or more local networks. For example, network interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical signals that carry digital data streams representing various types of information.

The computer system 1100 can send messages and receive data, including program code, through the network(s), network link and network interface 1118. In the Internet example, a server might transmit a requested code for an application program through the Internet, the ISP, the local network and the network interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A transportation hailing system, comprising:
a plurality of client devices, each of the client devices in communication with a network and executing an application to engage a transportation service;
a plurality of transportation devices, each of the transportation devices being associated with one of a plurality of drivers and executing an application to offer the transportation service;
a database storing state and action data for each driver, the state data being associated with the transportation service provided by the driver and the action data being associated with the driver receiving an incentive;
an incentive system coupled to the plurality of transportation devices, the database, and client devices via the network, the incentive system including:
a joint policy simulator, configure to generate, based on the state and action data for each driver, a simulated action of the each driver using a joint policy model, wherein the joint policy model includes an incentive policy, a confounding incentive policy, and an incentive object policy;
a discriminator, configure to generate rewards corresponding to the simulated action;
a reinforcement learning system, configure to provide an optimized incentive policy from the simulated action based on the rewards; and
an incentive server, configure to communicate a selected incentive to at least some of the transportation devices according to the optimized incentive policy, wherein the joint policy model is generated according to a training process including:
obtaining sample state and action data of a plurality of sample drivers;
for each of the plurality of sample drivers,
generating a sample incentive for the sample driver by inputting the sample state and action data of the sample driver into the incentive policy;
generating another sample incentive for the sample driver by inputting the sample state and action data of the sample driver and the sample incentive into the confounding incentive policy;

generating a simulated action of the sample driver by inputting the sample state and action data of the sample driver, the sample incentive, and the another sample incentive into the incentive object policy;
determining a reward based on an output of the discriminator, the output of the discriminator being obtained by inputting the simulated action and the sample state and action data into the discriminator; and
generating the joint policy model based on the reward of each of the plurality of sample drivers.

2. The transportation hailing system of claim 1, wherein the incentive system includes a driver value engine operable to output a ranking priority of drivers based on the actions and states in the database.

3. The transportation hailing system of claim 2, wherein the incentive server is operable to provide incentives to drivers based on the ranking priority and the optimized incentive policy.

4. The transportation hailing system of claim 3, wherein the incentive server is operable to allocate an incentive budget over a period of time, and wherein the incentives are limited by the incentive budget over the period of time.

5. The transportation hailing system of claim 4, wherein the incentive budget is equally allocated over the period of time.

6. The transportation hailing system of claim 4, wherein the incentive budget is allocated to favor certain periods over the period of time.

7. The transportation hailing system of claim 1, wherein the joint policy model is a neural network.

8. The transportation hailing system of claim 1, wherein the selected incentive is a coupon allowing a driver to redeem value after a certain number of transportation services are provided.

9. The transportation hailing system of claim 1, wherein the reinforcement learning system operates according to a policy gradient method.

10. The transportation hailing system of claim 1, wherein the historical trajectories are selected based on drivers that are classified as a fading driver.

11. A method to motivate drivers in a transportation hailing system, the transportation hailing system including a plurality of client devices, a plurality of transportation devices, a database, and an incentive system, each of the client devices in communication with a network and executing an application to engage a transportation service, each of the transportation devices being associated with one of a plurality of drivers and executing an application to offer the transportation service, the incentive system being coupled to the plurality of transportation devices, the database, and client devices via the network, the incentive system including a joint policy simulator, a discriminator, a reinforcement learning system, and an incentive server, the method comprising:
storing state and action data for each driver in the database coupled to the network, wherein the state data being associated with the transportation service provided by the driver and the action data being associated with the driver receiving an incentive;
generating, by the joint policy simulator, a simulated action of the each driver based on the state and action data for each driver using a joint policy model, wherein the joint policy model includes an incentive policy, a confounding incentive policy, and an incentive object policy;
determining, by the discriminator, rewards corresponding to the simulated action;
providing, by the reinforcement learning system, an optimized incentive policy from the simulated action based on the rewards; and
communicating, by the incentive server, a selected incentive to at least some of the transportation devices over the network according to the optimized incentive policy, wherein the joint policy model is generated according to a training process including:
obtaining sample state and action data of a plurality of sample drivers;
for each of the plurality of sample drivers,
generating a sample incentive for the sample driver by inputting the sample state and action data of the sample driver into the incentive policy;
generating another sample incentive for the sample driver by inputting the sample state and action data of the sample driver and the sample incentive into the confounding incentive policy;
generating a simulated action of the sample driver by inputting the sample state and action data of the sample driver, the sample incentive, and the another sample incentive into the incentive object policy;
determining a reward based on an output of the discriminator, the output of the discriminator being obtained by inputting the simulated action and the sample state and action data into the discriminator; and
generating the joint policy model based on the reward of each of the plurality of sample drivers.

12. The method of claim 11, further comprising generating a ranking priority of drivers based on the actions and states in the via a driver value engine.

13. The method of claim 12, wherein the incentive server communicates the selected incentives to drivers based on the ranking priority and the optimized incentive policy.

14. The method of claim 13, wherein the incentive server allocates an incentive budget over a period of time, and wherein the incentives are limited by the incentive budget over the period of time.

15. The method of claim 14, wherein the incentive budget is equally allocated over the period of time.

16. The method of claim 14, wherein the incentive budget is allocated to favor certain periods over the period of time.

17. The method of claim 11, wherein the generating incentive policy, incentive object policy and confounding policy is performed by a neural network.

18. The method of claim 11, wherein the selected incentive is a coupon allowing a driver to redeem value after a certain number of transportation services are provided.

19. The method of claim 11, wherein the reinforcement learning is a policy gradient method.

20. The method of claim 11, wherein the historical trajectories are selected based on drivers classified as fading drivers.

* * * * *